US012621863B2

(12) United States Patent
Bartier et al.

(10) Patent No.: US 12,621,863 B2
(45) Date of Patent: *May 5, 2026

(54) ADAPTIVE TRANSMISSION MANAGEMENT BASED ON LINK LATENCY

(71) Applicant: ITRON, INC., Liberty Lake, WA (US)

(72) Inventors: Jerome Bartier, Edinburgh (GB);
Fabrice Monier, Bry-sur-Marne (FR);
Yacine Khaled, Meudon (FR)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,806

(22) Filed: Nov. 3, 2023

(65) Prior Publication Data

US 2024/0080896 A1 Mar. 7, 2024

Related U.S. Application Data

(63) Continuation of application No. 17/527,020, filed on Nov. 15, 2021, now Pat. No. 11,825,518.

(51) Int. Cl.
H04W 74/0808 (2024.01)
H04L 1/08 (2006.01)
H04L 43/0852 (2022.01)
H04W 84/18 (2009.01)

(52) U.S. Cl.
CPC ........... H04W 74/0825 (2013.01); H04L 1/08 (2013.01); H04L 43/0852 (2013.01); H04W 84/18 (2013.01)

(58) Field of Classification Search
None
See application file for complete search history.

(56) References Cited

U.S. PATENT DOCUMENTS

| | | | |
|---|---|---|---|
| 11,539,458 B2 | 12/2022 | Noh et al. | |
| 11,825,518 B2 * | 11/2023 | Bartier | H04L 43/0852 |
| 2008/0123682 A1 | 5/2008 | Yackoski et al. | |
| 2013/0022083 A1 | 1/2013 | Vasseur et al. | |
| 2013/0028103 A1 | 1/2013 | Hui et al. | |
| 2015/0049644 A1 | 2/2015 | Lee | |
| 2016/0037449 A1 | 2/2016 | Kandhalu Raghu et al. | |
| 2017/0116063 A1 * | 4/2017 | Ueda | G06F 11/079 |
| 2018/0027588 A1 * | 1/2018 | Vijayasankar | H04W 74/0808 |
| | | | 370/329 |
| 2018/0146489 A1 | 5/2018 | Jin et al. | |
| 2018/0302911 A1 * | 10/2018 | Aijaz | H04L 12/189 |
| 2019/0182774 A1 * | 6/2019 | Jain | H04W 52/0235 |
| 2019/0268942 A1 * | 8/2019 | Yi | H04W 74/0816 |
| 2019/0363976 A1 * | 11/2019 | Thubert | H04L 45/306 |

(Continued)

FOREIGN PATENT DOCUMENTS

WO WO-2020020852 A1 * 1/2020 ............... H04L 1/08

*Primary Examiner* — Anh Vu H Ly
(74) *Attorney, Agent, or Firm* — Artegis Law Group, LLP

(57) ABSTRACT

Various embodiments disclose a method comprising determining, by a first node, a first link latency associated with a second node based on a time period between consecutive slots in a unicast listening schedule for the second node; in response to the first node detecting a failure in transmitting a first frame to the second node, determining, by the first node based on the first link latency, a first backoff time; and in response to determining that the first backoff time has elapsed, retransmitting, by the first node, the first frame to the second node.

20 Claims, 4 Drawing Sheets

(56) References Cited

U.S. PATENT DOCUMENTS

| | | | |
|---|---|---|---|
| 2020/0260486 A1* | 8/2020 | Zhou | H04L 1/1835 |
| 2021/0250776 A1 | 8/2021 | Yerramalli et al. | |
| 2022/0109546 A1* | 4/2022 | Panteleev | H04L 5/0053 |
| 2022/0337358 A1 | 10/2022 | Hett et al. | |

* cited by examiner

400

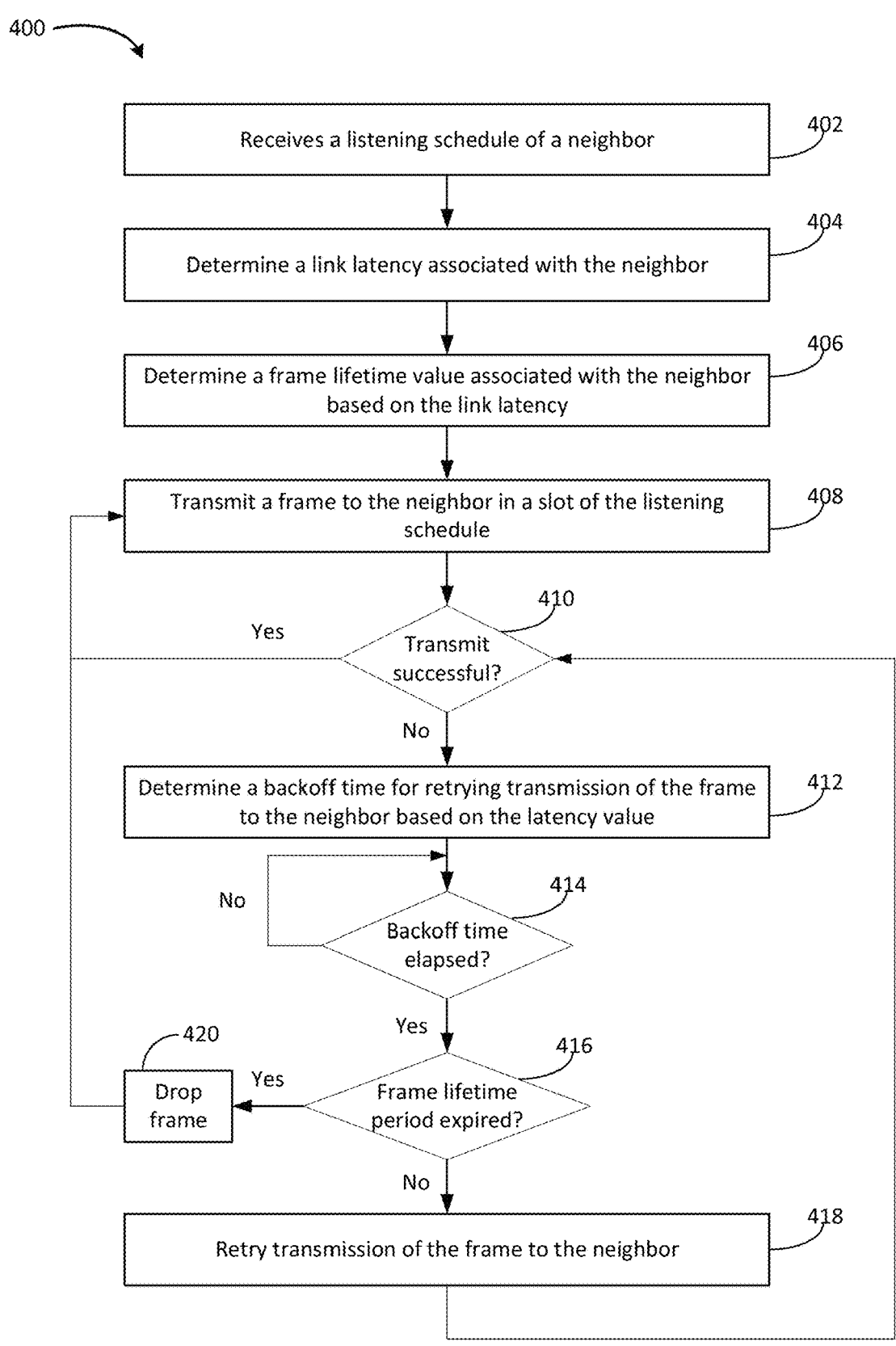

Receives a listening schedule of a neighbor — 402

Determine a link latency associated with the neighbor — 404

Determine a frame lifetime value associated with the neighbor based on the link latency — 406

Transmit a frame to the neighbor in a slot of the listening schedule — 408

410
Transmit successful?

Yes

No

Determine a backoff time for retrying transmission of the frame to the neighbor based on the latency value — 412

414
Backoff time elapsed?

No

Yes

420
Drop frame

Yes

416
Frame lifetime period expired?

No

Retry transmission of the frame to the neighbor — 418

FIG. 4

ADAPTIVE TRANSMISSION MANAGEMENT BASED ON LINK LATENCY

CROSS-REFERENCE TO RELATED APPLICATIONS

This application is a continuation of United States patent application titled, "Adaptive Transmission Management based on Link Latency," filed on Nov. 15, 2021, and having Ser. No. 17/527,020. The subject matter of this related application is hereby incorporated herein by reference.

BACKGROUND

Field of the Various Embodiments

The various embodiments relate generally to wireless network communications, and more specifically, to adaptive transmission based on link latency.

DESCRIPTION OF THE RELATED ART

A wireless mesh network includes a plurality of nodes that are configured to communicate with and transmit data to one another using one or more communication protocols. In lieu of using a hierarchal topology, individual nodes within a wireless mesh network establish direct connections with other nodes within the network in order to efficiently route data to different locations in the network.

A given node in a mesh network can discover the listening schedules of its neighboring nodes, and the listening schedule of the given node can be discovered by its neighboring nodes. When each of multiple neighboring nodes of a given node transmit a frame to the given node in the same slot, collisions can occur. In response to a collision, a transmitting node can back off for a period of time before trying again with an attempt to retransmit the frame. Further, attempts to retransmit a frame can be limited to a frame lifetime. If the frame lifetime of a frame expires before the frame is successfully transmitted, the frame is dropped and no further attempts are made to retransmit the frame.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 is a flow diagram of method steps for managing transmissions based on link latency, according to various embodiments.

DETAILED DESCRIPTION

Figure 1:
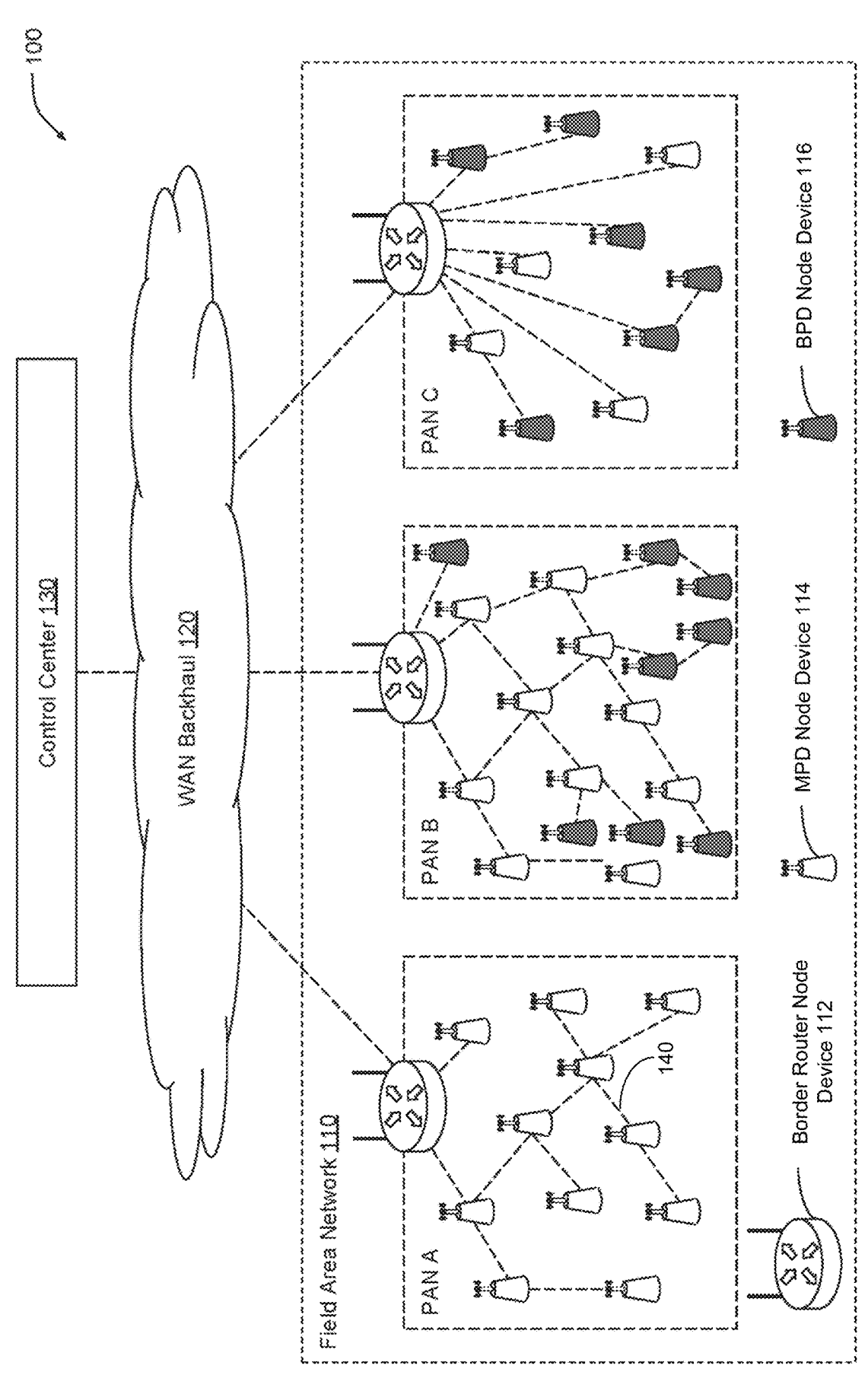
FIG. 1 illustrates a network system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

In a mesh network, a given node device can follow different listening schedules for different neighbors, with different link latencies. A link latency (or "slot period") in a listening schedule, as used herein, is a time period from the start of one slot to the start of the next slot. A link latency can include a length of a slot and a length of a period of inactivity between the slot and the next slot. For example, a node device can have one or more neighbors that adopt a listening schedule with a long link latency and can have one or more other neighbors that adopt a listening schedule with a shorter link latency.

A node device in the mesh network can transmit a packet or frame of data to a neighboring node device, and the transmission can succeed or fail. If the transmission fails, the transmitting node device can back off for a period of time before attempting to retransmit the frame to the neighboring node device or attempting to transmit other frames to the neighboring node device. Further, attempts to retransmit a frame can be limited to a frame lifetime. If the frame lifetime of a frame expires before the frame is successfully transmitted, the frame is dropped and irretrievably lost.

Typically, a backoff time before a transmission retry can be determined as a random or exponential backoff window based on a common backoff time period. A drawback of this approach is that the backoff window and the link latency for a given link can mismatch, resulting in a backoff window that is too aggressive or too weak for a given link. For example, if the backoff window is shorter than the length of the link latency for a given link, then the backoff window merely pushes retransmission into the next slot, which defeats the benefits of the randomness or exponentiality of the backoff. Furthermore, the network typically implements a common lifetime for all frames in the network. When the common frame lifetime is too short or too long for the listening schedule for a given link, frame losses or network congestion, respectively, can result.

In order to address these shortcomings, techniques are disclosed herein that enable a node device to adjust backoff times and frame lifetimes based on characteristics of the link with one or more neighboring node devices. In various embodiments, a node device in a network can adapt the backoff time for attempting a retransmission of a frame to a neighboring node device to the latency of the link to that neighboring node device. A node device can obtain a listening schedule of a neighboring node device to determine a link latency of a link to the neighbor based on the listening schedule. The node device can determine a backoff time for retrying the transmission as a function of the link latency of the link. Further, in some embodiments, the node device can also adapt a lifetime value for frames to be transmitted to a neighbor to the link latency of the link to the neighbor. The node device can determine a frame lifetime for frames to be transmitted by the frame to a neighbor by determining a frame lifetime value for frames to be transmitted by the node device to the neighbor as a function of the link latency of the link to the neighbor.

At least one technical advantage of the disclosed techniques is that, with the disclosed techniques, backoff times and frame lifetimes for transmission to a neighboring node are adapted to the characteristics of the link with the neighboring node. Accordingly, the backoff times and frame lifetimes are adjusted to appropriate values for each individual link and neighboring node. This adaptation of backoff times and frame lifetimes to the characteristics of the relevant link reduces the likelihood of repetitive collisions, unnecessary delays in retransmission, unnecessary dropping of frames for failure to successfully retransmit, and/or reduction of congestion in the network. These technical advantages provide one or more technological advancements over prior art approaches.

System Overview

FIG. 1 illustrates a network system configured to implement one or more aspects of the various embodiments. As shown, network system 100 includes, without limitation, field area network (FAN) 110, wide area network (WAN) backhaul 120, and control center 130. FAN 110 is coupled to control center 130 via WAN backhaul 120. Control center 130 is configured to coordinate the operation of FAN 110. Network system 100 includes a plurality of node devices that are configured to communicate with each other according to the techniques described herein.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, can power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices (also referred to as neighbors or neighbor node devices) via bi-directional communication links. In various embodiments, a given communication link can be wired or wireless links, although in practice, adjacent node devices of a given PAN exchange data with one another by transmitting data packets or frames via wireless radio frequency (RF) communications. The various node types are configured to perform a technique, known in the art as "channel hopping," in order to periodically transition between different channels and receive data frames on those different channels. The particular sequence of channels across which a node transitions is referred to as a "listening schedule," "channel hopping sequence" or a "channel schedule." In a listening schedule, each channel in the schedule is associated with a respective time slot. As known in the art, a "channel" can correspond to a particular range of frequencies. In one embodiment, a node device can compute a current "receive" channel by evaluating a Jenkins hash function that is based on a total number of channels, the media access control (MAC) address of the node device, and/or other information associated with the node device.

In various embodiments, each node device within a given PAN can implement a discovery protocol to identify one or more adjacent node devices or "neighbors." In such instances, a node device that has identified an adjacent, neighboring node device can establish a bi-directional communication link 140 with the neighboring node device. In many instances, neighboring nodes may be physically closer together than other nodes in network system 100, but this may not always be the case (e.g., because of physical barriers that impede communication between physically proximate nodes). Each neighboring node device can update a respective neighbor table to include information concerning the other node device, including the MAC address of the other node device, as well as a received signal strength indication (RSSI) of the communication link established with that node device. In various embodiments, the neighbor table can include information about one or more communication modes that the neighbor mode is capable of supporting, such as the operating parameters (e.g., data rates, modulation scheme, channel spacing, frequencies supported, listening schedule, etc.).

Node devices can compute the channel hopping sequences of adjacent node devices in order to facilitate successful transmission of data frames to such node devices. In embodiments where node devices implement the Jenkins hash function, a node device can compute a "current receive" channel of an adjacent node device using the total number of channels, the MAC address of the adjacent node device, and/or a time slot number assigned to a current time slot of the adjacent node device.

Any of the node devices discussed above can operate as a source node device, an intermediate node device, or a destination node device for the transmission of data frames. In some embodiments, a given source node device can generate a data frame and then transmit the data frame to a destination node device via any number of intermediate node devices (in mesh network topologies). In such instances, the data frame can indicate a destination for the frame and/or a particular sequence of intermediate node devices to traverse in order to reach the destination node device. In some embodiments, each intermediate node device can include a forwarding database indicating various network routes and cost metrics associated with each route.

Node devices 112, 114, 116 transmit data frames across a given PAN and across WAN backhaul 120 to control center 130. Similarly, control center 130 transmits data frames across WAN backhaul 120 and across any given PAN to a particular node device 112, 114, 116 included therein. As a general matter, numerous routes can exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data frames that traverse within network system 100. In various embodiments, the server machines can query node devices within network system 100 to obtain various data, including raw and/or processed sensor data, power consumption data, node/network throughput data, status information, and so forth. The server machines can also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
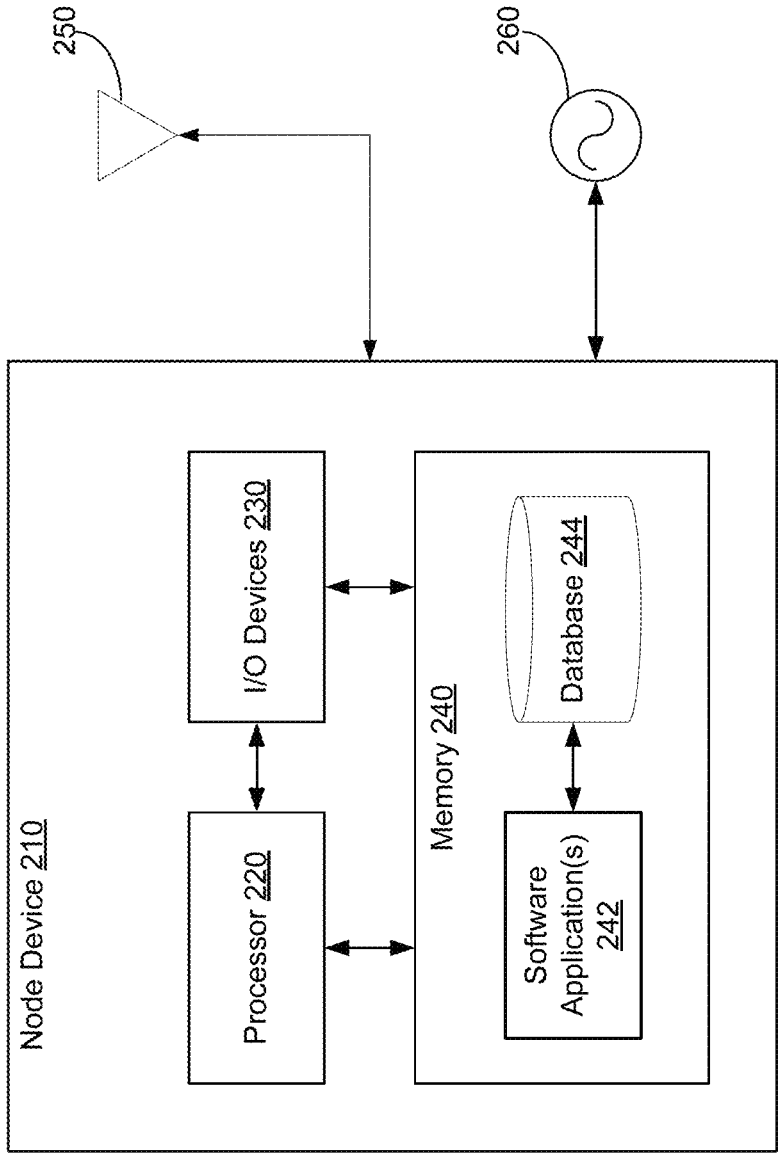
FIG. 2 illustrates a node device configured to transmit and receive data within the network system of FIG. 1, according to various embodiments.

In various embodiments, node devices 112, 114, 116 can likewise include computing device hardware configured to perform processing operations and execute program code. Each node device can further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that can operate within the network system 100.

Node Device

FIG. 2 illustrates a node device configured to transmit and receive data within the network system 100 of FIG. 1, according to various embodiments. As shown, node device 210 is coupled to transceiver 250 and oscillator 260. Node device 210 includes, without limitation, processor 220, input/output devices 230, and memory 240. Memory 240 includes one or more applications (e.g., software application 242) that communicate with database 244.

Processor 220 coordinates the operations of node device 210. Transceiver 250 is configured to transmit and/or receive data frames and/or other messages across network system 100 using a range of channels and power levels. Oscillator 260 provides one or more oscillation signals, according to which, in some embodiments, node device 210 can schedule the transmission and reception of data frames. In some embodiments, node device 210 can be used to implement any of border router node devices 112, MPD node devices 114, and/or BPD node devices 116 of FIG. 1.

Node device 210 includes a processor 220, input/output (I/O) devices 230, and memory 240, coupled together. In various embodiments, processor 220 can include any hardware configured to process data and execute software applications. Processor 220 can include a real-time clock (RTC) (not shown) according to which processor 220 maintains an estimate of the current time. The estimate of the current time can be expressed in Universal Coordinated Time (UTC), although any other standard of time measurement can also be used. I/O devices 230 include devices configured to receive input, devices configured to provide output, and devices configured to both receive input and provide output. Memory 240 can be implemented by any technically feasible computer-readable storage medium.

Memory 240 includes one or more software applications 242 and database 244, coupled together. The one or more software applications includes program code that, when executed by processor 220, can performs any of the node-oriented computing functionality described herein. The one or more software applications 242 can also interface with transceiver 250 to coordinate the transmission and/or reception of data frames and/or other messages across network system 100, where the transmission and/or reception is based on timing signals generated by oscillator 260. In various embodiments, memory 240 can be configured to store protocols used in communication modes, equations and/or algorithms for identifying metric values, constants, data rate information, and other data used in identifying metric values, etc.

In operation, software application(s) 242 can implement various techniques to optimize communications with one or more linked node devices, such as a neighboring node device. In various embodiments, node device 210 can be configured to, using a plurality of different communication modes, transmit data messages to the linked node device and/or receive data messages from the linked node device by selecting a common communication mode that is supported by node device 210 and the linked node device. More generally, node device 210 can be configured for multi-mode communications. Node device 210 can communicate with a linked node or with control center 130 using any of a plurality of modes. The particular mode used for a given transmission depends on the particular circumstances of the transmission (e.g., the type of data message, the intended recipients of the data message, etc.). Examples of the modes include, without limitation, unicast, broadcast, and multicast.

In various embodiments, when a node device 210 detects that a transmission of a frame to a neighbor has failed, the node device 210 can back off for a period of time before retrying to transmit the frame or re-queueing the frame for an attempt to retransmit. Node device 210 can detect the failure to transmit the frame by determining that an acknowledgement of receipt of the frame by the neighbor has not been received by node device 210. Node device 210 can determine the length of the backoff time by which node device 210 backs off in response to detecting the failure to transmit the frame. After the backoff time has elapsed, node device 210 can retransmit the frame or re-queue the frame for retransmission.

In various embodiments, a given frame has a frame lifetime value. As used herein, a "frame lifetime value" refers to a period of time over which a node device 210 has to attempt to successfully transmit the frame to a neighboring node device before the node device 210 can give up on trying to successfully transmits the frame to the neighboring node device. In various embodiments, the frame lifetime value of a given frame is determined by the node device 210 that will transmit the frame. In various instances, the frame lifetime value may be set based on network conditions. In some embodiments, a frame lifetime value may be set in common across a plurality of nodes in FAN 110. In various embodiments, a node device 210 sets a frame lifetime value for a frame to be transmitted by the node device to a neighbor. The frame lifetime period for a frame, whose time length is defined by the frame lifetime value, can in some embodiments begin upon receipt of the request to transmit the frame (e.g., receipt of the request from a higher layer in the communications architecture of the node device). In some other embodiments, the frame lifetime period begins from the initial attempt to transmit the frame. Within the frame lifetime period, node device 210 can back off and retry transmitting the frame to the neighbor as many times as needed to successfully transmit the frame. If the frame is still not transmitted successfully after the expiration of the frame lifetime period, node device 210 drops the frame and makes no further attempts to transmit the frame.

In some embodiments, a given frame has a maximum retry count. The maximum retry count defines a threshold amount of times transmission of a frame can be retried to attempt to transmit the frame. The maximum retry count can be predefined for FAN 110 and/or configured by an administrator of FAN 110. If the frame is not transmitted successfully after the maximum retry count is exceeded, the node device drops the frame and the frame is irretrievably lost. Accordingly, a frame can be dropped if the frame lifetime period for the frame has expired and/or the number of retries for transmitting the frame exceeds the maximum retry count, without successful transmission of the frame. In some embodiments, the maximum retry count is twenty-four (although any suitable number may be used). More generally, the maximum retry count can be a predefined value (e.g., at design time), be a value configurable by a user (e.g., by an administrator), and/or be a value that can be determined (e.g., calculated) by a node device based on an algorithm or a mathematical function.

In various embodiments, node devices in FAN 110 can have different listening schedules. For example, for any given node device in FAN 110, the listening schedule of a first neighbor can be different from the listening schedule of a second neighbor. The node device transmits frames to the first neighbor according to the listening schedule of the first neighbor and transmits frames to the second neighbor according to the different listening schedule of the second neighbor. Accordingly, listening schedules are not necessarily the same across FAN 110. Different node devices can have different listening schedules for any number of reasons, including for example network conditions. Different listening schedules amongst neighbors of a node are discussed in further detail with reference to FIG. 3 below.

Listening Schedules

Figure 3:
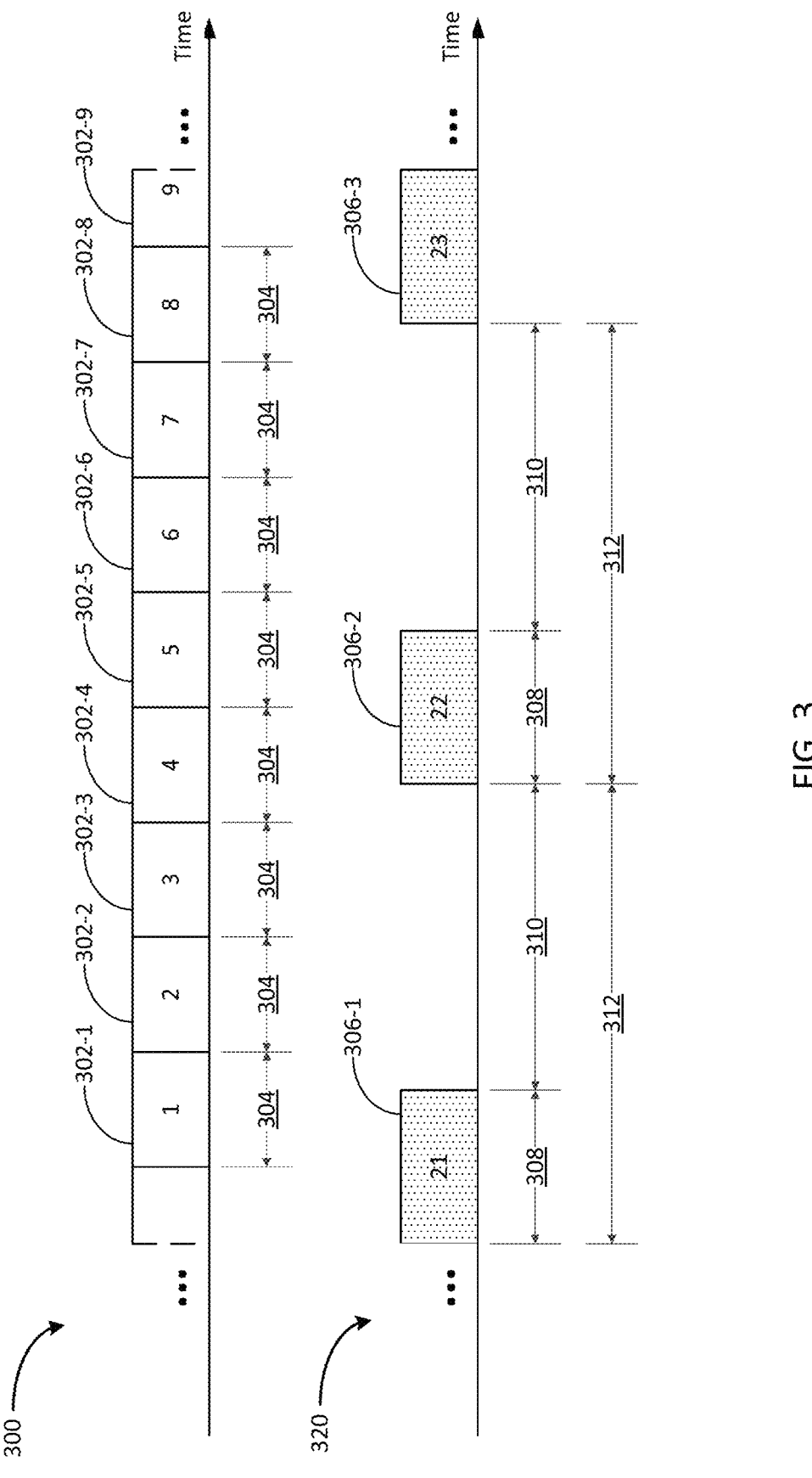
FIG. 3 illustrates channel schedules of multiple neighbors of a node device within the network system of FIG. 1, according to various embodiments.

FIG. 3 illustrates listening schedules of multiple neighbors of a node device within the network system of FIG. 1, according to various embodiments. Listening schedule 300 is a listening schedule of a first node device 210 (hereinafter "Node 1") neighboring a given node device 210 (hereinafter "Node 0") within FAN 110 and listening schedule 320 is a listening schedule of a second node device 210 (hereinafter "Node 2") neighboring Node 0. It should be appreciated that individual node devices 210 within FAN 110 can have different listening schedules, and accordingly a node can have neighbors with different listening schedules. For example, listening schedules 300 and 320 illustrate concurrent-in-time portions of listening schedules for two neighbors, Node 1 and Node 2, respectively, of Node 0 in FAN 110.

A listening schedule of a node device 210 (e.g., a unicast channel schedule) has a sequence of time slots, each of which is assigned a channel in the channel hopping sequence for the node device 210. For example, listening schedule 300 for Node 1 indicates slots 302-1 thru 302-9 when Node 1 is listening and indicates when and on what channel Node 0 should transmit frames to Node 1. Slot 302-1 is assigned channel 1, time slot 302-2 is assigned channel 2, slot 302-3 is assigned channel 3, and so on. While the channel numbers in listening schedule 300 are numbered in numerical order, it should be appreciated that the channel frequency ranges assigned to the different slots need not be in sequential or numerical order and can be random or otherwise non-sequential.

Listening schedule 320 for Node 2 indicates time slots 306-1, 306-2, and 306-3 when Node 2 is listening and indicates when and on what channel Node 0 should transmit frames to Node 2. Time slot 306-1 is assigned channel 21, time slot 306-2 is assigned channel 22, and time slot 306-3 is assigned channel 23. Again, while the channel numbers in listening schedule 320 are numbered in numerical order, it should be appreciated that the channel frequency ranges assigned to the different slots need not be in sequential or numerical order and can be random or otherwise non-sequential. More generally, each neighboring node device 210 can have a different sequence of channels in its listening schedule.

A listening schedule for a link to a neighbor has a link latency, which can include a slot time (also called an "active slot time") and an inactive slot time. An active slot time is the length of the slots in the listening schedule. An inactive slot time is the length of the period of inactivity between one slot and the next slot. As shown in FIG. 3, listening schedules 300 and 320 have different link latencies. In listening schedule 300 for Node 1, each slot 302 has an active slot time 304, and there is no inactive slot time because there are no periods of inactivity between slots in listening schedule 300. That is, the end of one slot 302 transitions into the beginning of the next slot, with no period of inactivity in between. Accordingly, the link latency in listening schedule 300 is the same as active slot time 304. In some embodiments, the length of active slot time 304 can be predefined and/or adjusted by Node 1 (e.g., adjusted based on network conditions).

On the other hand, in listening schedule 320 for Node 2, each slot 306 has an active slot time 308 and is followed by an inactive slot time 310. That is, the end of one slot 306 transitions into a period of inactivity before the beginning of the next slot. Accordingly, listening schedule 320 has a link latency 312 that includes active slot time 308 and inactive slot time 310. During the inactive slot time, Node 2 is not listening for or receiving transmissions from node devices 210 including Node 0, and Node 0 can accordingly refrain from attempting to transmit frames to Node 2 during the inactive slot time. In some embodiments, the lengths of active slot time 308 and inactive slot time 310 can be predefined and/or adjusted by Node 2 (e.g., adjusted based on network conditions).

In some embodiments, listening schedule 300 as shown corresponds to a default listening schedule for FAN 110 that can be used under "good" network conditions in which frames are transmitted to neighbors at a higher (e.g., faster) bit rate and/or over a shorter distance, with a relatively high degree of success (e.g., few instances of failure, lossiness of the link is within normal levels). In some embodiments, listening schedule 320 as shown corresponds to a listening schedule that can be used under network conditions in which frames are transmitted to neighbors at a lower (e.g., slower) bit rate and/or over a longer distance.

In some embodiments, the start of a slot 302 in listening schedule 300 can be aligned with the start of a slot 306 in listening schedule 320. In some embodiments, the start of a slot 302 in listening schedule 300 is not aligned with the start of a slot 306 in listening schedule 320. In some embodiments, active slot time 304 in listening schedule 300 is equal to or is a multiple of active slot time 308. In some embodiments, active slot time 304 is different from active slot time 308. In some embodiments, inactive slot time 310 is a multiple of active slot time 308. In some embodiments, the length of link latency 312 is a multiple of active slot time 304 or active slot time 308.

A node device 210 can discover the listening schedules of its neighboring node devices. For example, Node 0 can discover listening schedules 300 and 320 of Node 1 and Node 2, respectively, as part of a discovery protocol for identifying neighboring node devices. Accordingly, when Node 0 attempts to transmit a frame to Node 1, Node 0 selects a channel for the transmission attempt based on listening schedule 300 of Node 1, because Node 0 knows that that is when Node 1 is listening for transmissions. That is, Node 0 selects the channel assigned to a current slot in listening schedule 300. Similarly, when Node 0 attempts to transmit a frame to Node 2, Node 0 selects a channel for the transmission attempt based on listening schedule 320 of Node 2, because Node 0 knows that is when Node 2 is listening for transmissions. That is, Node 0 selects the channel assigned to a current slot in listening schedule 320.

A node device 210 can discover the listening schedule of a neighboring device in any technically feasible manner. For example, Node 1 and Node 2 could transmit listening schedules 300 and 320, respectively, to Node 0 during a neighboring node device discovery process according to a discovery protocol. Node 0 can update its neighbor table to include listening schedule 300 for neighbor Node 1 and listening schedule 320 for neighbor Node 2. As another example, Node 0 could compute listening schedules 300 and 320 for neighbors Node 1 and Node 2, respectively, using a Jenkins hash function approach.

In some embodiments, a node device 210 can modify its listening schedule. For example, a node device 210 could detect network conditions and modify its listening schedule based on the network conditions. The node device can modify its channel schedule by modifying the active slot time, adding an inactive slot time, removing the inactive slot time, and/or modifying the inactive slot time. In a specific example, a node device 210 can switch from a listening schedule that is similar to listening schedule 300 to a listening schedule that is similar to listening schedule 320, or vice versa.

Adaptive Backoff

As described above, in response to a failure to transmit a frame to a neighbor, a node device 210 can back off for a period of time before attempting to transmit to the neighbor again (e.g., retrying to transmit the frame that had failed to transmit or transmitting another frame). In some embodiments, the backoff time can be determined as a random backoff time, but without regard for different link latencies. A backoff time suitable for one link latency could be too aggressive or too weak for another, significantly different link latency. For example, returning to the example illustrated in FIG. 3, a backoff time that would be a long enough backoff so that a retry from slot 302-1 would occur in slot 302-4 in listening schedule 300 would likely be too short if used in listening schedule 320, merely delaying the transmission retry to the next slot in listening schedule 320 because listening schedule 320 has a significantly longer link latency. This mere delay of the retry to the next slot defeats the purpose of a random backoff time.

To address these issues, a node device 210 can use a link latency as an input for determining the backoff time for a retry after determining that the transmission of a frame has failed. A node device 210 can determine, for a given link to a neighboring node device, a backoff time based on the link latency of the given link. Thus, for example, returning to the example of FIG. 3, Node 0 would determine backoff times for retransmissions to Node 1 based on the link latency in listening schedule 300 (e.g., active slot time 304) of Node 1. Node 0 would determine backoff times for retransmissions to Node 2 based on the link latency in listening schedule 320 (e.g., link latency 312).

In some embodiments, a node device 210 can calculate a backoff time using Equation 1 below:

$$\text{Backoff\_time} = (\text{active\_slot\_time} * (2 \wedge T_c)) + \text{Random}[0, \text{link\_latency} * (2 \wedge T_c)] \quad \text{[Equation 1]}$$

In Equation 1, active slot time is the length of the active slot time for the link (e.g., active slot time 304 or 308), $T_c$ is the retry count of the next retry to transmit (e.g., $T_c$ for the second retry attempt is 2, $T_c$ for the fifth retry attempt is 5, etc.), and link_latency is the length of the link latency for the link (e.g., active slot time 304 for Node 1 or link latency 312 for Node 2). Accordingly, the backoff time backoff_time as calculated per Equation 1 includes a base window that is based on the active slot time and scales exponentially with the number of retries, and a random value the maximum of which is based on the link latency and also scales exponentially with the number of retries.

In some other embodiments, a node device 210 can calculate a backoff time using Equation 2 below:

$$\text{Backoff\_time} = \text{Random}[0, \text{link\_latency} * (2 \wedge T_c)] \quad \text{[Equation 2]}$$

Equation 2 is similar to Equation 1, except that the base window based on active_slot_time is omitted. Accordingly, the backoff time calculated using Equation 2 is a random number, the maximum of which is based on the link latency of the link and scales exponentially with the number of retries.

It should be appreciated that Equation 1 and Equation 2 above are merely exemplary. Other equations, algorithms, or functions, based on the link latency of the link, for determining the backoff time are possible. For example, in some embodiments, Equation 1 or 2 above can further include a scaling factor for scaling the active_slot_time or the link_latency.

Adaptive Frame Lifetime

Also as described above, each frame in FAN 110 is associated with a frame lifetime value. In conventional approaches, a common frame lifetime value is predefined for frames across FAN 110. This has a drawback of defining a frame lifetime value that can be inappropriate for a given link. For example, a frame lifetime value that would be optimal for a channel schedule with no inactive slot times (e.g., listening schedule 300) would be too short for a channel schedule with significant inactive slot times (e.g., listening schedule 320) because the same frame lifetime value would yield a reduced number of retry opportunities in a listening schedule with significant inactive slot times (e.g., less slots included per frame lifetime period). A frame lifetime value that offers sufficient retry opportunities in a listening schedule with significant inactive slot times would be too long for a listening schedule with no inactive slot times, allowing for too many retry opportunities and thereby increasing the likelihood of network congestion.

To address these issues, a node device 210 can use the link latency of a link as an input for determining a frame lifetime value for frames to be transmitted on the link to a neighbor. A node device 210 can determine, for a given link to a neighboring node device, a frame lifetime value for frames to be transmitted on the given link based on the link latency of the given link. Thus, for example, returning to the example of FIG. 3, Node 0 would determine a frame lifetime value for frames transmitted and to be transmitted to Node 1 based on the link latency in listening schedule 300 (e.g., active slot time 304) of Node 1. Node 0 would determine a frame lifetime value for frames transmitted and to be transmitted to Node 2 based on the link latency in listening schedule 320 (e.g., link latency 312).

In some embodiments, a node device 210 can calculate a frame lifetime value using Equation 3 below:

$$\text{Frame\_lifetime} = \text{link\_latency} * S \quad \text{[Equation 3]}$$

In Equation 3, link_latency is the length of the link latency (e.g., active slot time 304 or link latency 312), and S is a constant scaling factor that can be a predefined value and/or a user-configurable value. Accordingly, the frame lifetime value is scaled based on the link latency of the link. In some embodiments, minimum and maximum frame lifetime values can also be defined for FAN 110 to bound the calculated frame lifetime value for a link. The minimum and/or maximum frame lifetime values can be predefined and/or user-configurable values. Accordingly, a node device 210 can determine a frame lifetime value per link based on the listening schedule, in particular the slot period, for the link.

It should be appreciated that Equation 3 above is merely exemplary. Other equations, algorithms, or functions, based on the link latency of the link, for determining the frame lifetime time are possible. Also, in some embodiments, a default frame lifetime value can be set for a link for which a link-specific frame lifetime value has yet to be calculated.

Accordingly, as described above, backoff times and frame lifetime values can be adapted to the latencies of links to different neighbors. In various embodiments, a backoff time as described above is determined for individual retry attempts. A frame lifetime value as described above can be determined at a node device 210 for a link to a neighbor of the node device and stored at the node device (e.g., in database 244) until the listening schedule for the link changes, in which case the frame lifetime value can be re-determined by the node device and updated in database 244.

FIG. 4 is a flow diagram of method steps for managing transmissions based on link latency, according to various embodiments. Although the method steps are described with respect to the systems of FIGS. 1-3, persons skilled in the art will understand that any system configured to perform the method steps, in any order, falls within the scope of the various embodiments.

As shown, a method 400 begins at step 402, where software application 242 receives a listening schedule of a neighbor. A node device 210 can receive the listening schedule of a neighboring node device during a neighboring node discovery process. For example, in FIG. 3 Node 0 can discover neighbors Node 1 and Node 2 and receive listening schedules 300 and 320 from Node 1 and Node 2, respectively.

At step 404, software application 242 determines a link latency associated with the neighbor. Software application 242 of node device 210 determines a link latency of a link to a neighboring node device according to the listening schedule of the neighbor, received in step 402. For example, Node 0 could determine a link latency of the link from Node 0 to Node 1, according to listening schedule 300, as active slot time 304. Node 0 could determine link latency 312 of the link from Node 0 to Node 2, according to listening schedule 320.

At step 406, software application 242 determines a frame lifetime associated with the neighbor based on the link latency. Software application 242 of node device 210 determines a frame lifetime value for the link to the neighbor; the frame lifetime value defines a time period over which transmissions of the frame to the neighbor can be retried as needed before the frame is dropped. Software application 242 of node device 210 determines the frame lifetime value for the link to the neighbor based on the link latency associated with the neighbor, determined in step 404. For example, Node 0 could determine the frame lifetime value for the link from Node 0 to Node 1 based on the link latency of the link from Node 0 to Node 1 (e.g., active slot time 304), and set the frame lifetime value for frames to be transmitted from Node 0 to Node 1 to the determined frame lifetime value for the link from Node 0 to Node 1. Node 0 could determine the frame lifetime value for the link from Node 0 to Node 2 based on link latency 312 of the link from Node 0 to Node 2) and set the frame lifetime value for frames to be transmitted from Node 0 to Node 2 to the determined frame lifetime value for the link from Node 0 to Node 2. In some embodiments, the frame lifetime value can be determined based on the link latency using Equation 3 above. In some embodiments, the frame lifetime value is set to a default value, a minimum value, or maximum value (e.g., if the frame lifetime value as determined using Equation 3 is below the minimum value or exceeds the maximum value).

At step 408, software application 242 transmits a frame to the neighbor in a slot of the listening schedule. Software application 242 determines a current active slot for transmission of a frame to the neighbor, and a channel range assigned to the current slot, according to the listening schedule of the neighbor. Software application 242 transmits the frame to the neighbor on the channel range during the active slot via transceiver 250. In some embodiments, the transmission of the frame in step 408 is the initial attempt to transmit the frame to the neighbor. In some embodiments, software application 242 starts the frame lifetime period for the frame upon receipt of the request to transmit the frame (e.g., receipt from a higher layer in the communications architecture of node device 210). In some other embodiments, software application 242 starts the frame lifetime period for the frame from the initial attempt to transmit the frame.

At step 410, software application 242 determines whether the transmission of the frame to the neighbor in step 408 is successful. Software application 242 can detect success of the transmission based on receipt of an acknowledgement of the frame by the neighbor. Accordingly, if software application 242 does not receive an acknowledgement of the frame by the neighbor, then software application 242 determines that the transmission failed.

If the transmission is successful (410—Yes), then method 400 proceeds back to step 408, where software application 242 can transmit another frame to the neighbor in another slot of the listening schedule.

If the transmission failed (410—No), then method 400 proceeds to step 412, where software application 242 determines a backoff time for retrying transmission of the frame to the neighbor based on the link latency. Software application 242 determines a backoff time for backing off before retrying to transmit the frame to the neighbor. The backoff time is determined based on the link latency determined in step 404. For example, Node 0 could determine a backoff time for a frame transmitted to Node 1 based on active slot time 304 and determine a backoff time for a frame transmitted to Node 2 based on link latency 312. In some embodiments, software application 242 determines a backoff time using Equation 1 or Equation 2 above. After determining the backoff time, software application 242 can start a backoff time period corresponding to the determined backoff time.

At step 414, software application 242 determines whether the backoff time has elapsed. If the backoff time period has not expired (414—No), then method 400 can loop back to step 414 to determine at a later time whether the backoff time has elapsed.

If the backoff time has elapsed (414—Yes), then method 400 proceeds to step 416, where software application 242 determines whether a frame lifetime period of the frame has expired. The frame lifetime period of the frame is defined by the frame lifetime value determined in step 406. If the frame lifetime period of the frame has expired (416—Yes), then method 400 proceeds to step 420, where software application 242 drops the frame, causing the frame to be irretrievably lost. Method 400 then proceeds back to step 408, where software application 242 can transmit another frame to the neighbor in another slot of the listening schedule.

If the frame lifetime period of the frame has not expired (416—No), then method 400 proceeds to step 418, where software application 242 retries transmission of the frame to the neighbor. After the expiration of the backoff time period and in accordance with a determination that the frame lifetime period for the frame has not expired, software application 242 retries transmission of the frame to the neighbor in a new active slot in the listening schedule of the neighbor. Method 400 then can proceed back to step 410, where software application 242 can determine whether the retry transmission is successful.

In some embodiments, software application 242 can also determine whether a number of retries of the frame has exceeded a maximum retry count. Software application 242 can make this determination between steps 410 and 418. If the number of retries has exceeded the maximum retry count, then software application 242 can drop the frame per step 420 and proceed to transmit another frame per step 408. If the number of retries has not exceeded the maximum retry count, then software application 242 can proceed with retrying transmission of the frame, per steps 412-418.

In sum, a node device in a network can adapt the backoff time for attempting a retransmission of a frame to a neighboring node device to the latency of the link to that neighboring node device. A node device can obtain a listening schedule of a neighboring node device, and accordingly determine a link latency of a link to the neighbor. The node device can use the link latency as an input for determining a backoff time for attempting a retransmission. Further, in some embodiments, the node device can also adapt a lifetime value for frames to be transmitted to a neighbor to the link latency of the link to the neighbor by using the link latency as an input for determining the lifetime value.

1. In some embodiments, a method comprises receiving, at a first node, a listening schedule associated with a second node; determining, by the first node, a first link latency associated with the second node based on the listening schedule; in response to the first node detecting a frame transmission failure for a frame being transmitted by the first node to the second node, determining, by the first node based on the first link latency, a backoff time; and in response to the first node determining that the backoff time has elapsed, the first node retransmitting the frame from the first node to the second node.

2. The method of clause 1, wherein the first link latency corresponds to a time period from a start of first slot to a start of a next slot in the listening schedule.

3. The method of clauses 1 or 2, wherein determining the backoff time based on the first link latency comprises determining a random value based on the first link latency.

4. The method of any of clauses 1-3, wherein the first link latency comprises an active slot time.

5. The method of any of clauses 1-4, wherein the first link latency further comprises an inactive slot time.

6. The method of any of clauses 1-5, further comprising receiving, at the first node, a second listening schedule associated with a third node; determining, by the first node, a second link latency associated with the third node based on the second listening schedule; in response to the first node detecting a frame transmission failure for a second frame being transmitted by the first node to the third node, determining, by the first node based on the second link latency, a second backoff time; and in response to the first node determining that the second backoff time has elapsed, the first node retransmitting the second frame from the first node to the third node.

7. The method of any of clauses 1-6, wherein the second link latency corresponds to a time period from a start of second slot to a start of a next slot in the second listening schedule.

8. The method of any of clauses 1-7, wherein the second link latency is different from the first link latency.

9. The method of any of clauses 1-8, further comprising determining, by the first node, a frame lifetime value associated with the second node based on the first link latency; in response to the first node determining that the backoff time has elapsed and prior to retransmitting the frame, determining, by the first node, that a time period corresponding to the frame lifetime value has elapsed; and in response to the first node determining that the time period corresponding to the frame lifetime value has elapsed, dropping, by the first node, the frame and forgoing retransmitting the frame.

10. The method of any of clauses 1-9, wherein determining the frame lifetime value associated with the second node based on the first link latency comprises multiplying the first link latency by a scaling factor.

11. In some embodiments, one or more non-transitory computer-readable media at a first node in a network, the one or more computer-readable storage media store program instructions that, when executed by one or more processors at the first node, cause the one or more processors at the first node to perform the steps of receiving a listening schedule associated with a second node; determining a first time period from a start of a first slot to a start of a next slot in the listening schedule; in response to detecting an unsuccessful attempt to transmit a frame by the first node to the second node, determining a backoff time based on the first time period; and in response to determining that the backoff time has elapsed, retransmitting the frame from the first node to the second node.

12. The one or more non-transitory computer-readable media of clause 11, wherein the first time period comprises an inactive slot time between the first slot and the next slot in the listening schedule.

13. The one or more non-transitory computer-readable media of clauses 11 or 12, wherein determining the backoff time based on the first time period comprises determining a random value based on the first time period.

14. The one or more non-transitory computer-readable media of any of clauses 11-13, wherein the steps further comprise receiving a second listening schedule associated with a third node; determining a second time period associated with the third node based on the second listening schedule; in response to detecting an unsuccessful attempt to transmit a second frame by the first node to the third node, determining a second backoff time based on the second time period; and in response to determining that the second backoff time has elapsed, retransmitting the second frame from the first node to the third node.

15. The one or more non-transitory computer-readable media of any of clauses 11-14, wherein the second time period is different from the first time period.

16. The one or more non-transitory computer-readable media of any of clauses 11-15, wherein the steps further comprise determining a frame lifetime value associated with the second node based on the first time period; in response to determining that the backoff time has elapsed and prior to retransmitting the frame, determining that a time period corresponding to the frame lifetime value has elapsed; and in response to determining that the time period corresponding to the frame lifetime value has elapsed, dropping the frame and forgoing retransmitting the frame.

17. In some embodiments, a node device in a wireless mesh network comprises a transceiver; one or more processors; and memory storing instructions that, when executed by the one or more processors, cause the one or more processors to receive a channel hopping sequence for a second node device neighboring the node device; determine a first link latency associated with the second node device based on the channel hopping sequence; in response to detecting a failure in transmitting a frame to the second node device, determine a backoff time based on the first link latency; and in response to determining that the backoff time has elapsed, retransmit the frame to the second node device via the transceiver.

18. The node device of clause 17, wherein the memory further stores instructions that, when executed by the one or more processors, cause the one or more processors to receive a second channel hopping sequence for a third node device neighboring the node device; determine a second link latency associated with the third node device based on the second channel hopping sequence; in response to detecting a failure in transmitting a second frame by the node device to the third node device, determine a second backoff time based on the second link latency; and in response to determining that the second backoff time has elapsed, retransmit the second frame to the third node device via the transceiver.

19. The node device of clauses 17 or 18, wherein the second link latency is different from the first link latency.

20. The node device of any of clauses 17-19, wherein the memory further stores instructions that, when executed by the one or more processors, cause the one or more processors to determine a frame lifetime value associated with the second node device based on the first link latency; in response to determining that the backoff time has elapsed and prior to retransmitting the frame, determine that a time period corresponding to the frame lifetime value has elapsed; and in response to determining that the time period corresponding to the frame lifetime value has elapsed, drop the frame and forgo retransmitting the frame.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A method comprising:

determining, by a first node, a first link latency associated with a second node, wherein the first link latency includes a first length of a slot of a unicast listening schedule for the second node and a second length from an end of the slot to a next slot in the unicast listening schedule;

in response to the first node detecting a failure in transmitting a first frame to the second node, determining, by the first node based on the first link latency, a length of a first backoff duration; and in response to determining that the first backoff duration has elapsed, retransmitting, by the first node, the first frame to the second node.

2. The method of claim 1, further comprising receiving, by the first node, the unicast listening schedule from the second node.

3. The method of claim 1, wherein determining the length of the first backoff duration based on the first link latency comprises determining a random value based on the first link latency.

4. The method of claim 1, wherein the length of the first backoff duration is further based on a retry count for the first frame.

5. The method of claim 1, wherein the first link latency is a sum of the first length and the second length.

6. The method of claim 1, further comprising:
determining, by the first node, a second link latency associated with a third node based on a time between consecutive slots in a unicast listening schedule for the third node;
in response to the first node detecting a failure in transmitting a second frame to the third node, determining, by the first node based on the second link latency, a length of a second backoff duration; and
in response to determining that the second backoff duration has elapsed, retransmitting, by the first node, the second frame from the first node to the third node.

7. The method of claim 6, wherein the second link latency is different from the first link latency.

8. The method of claim 1, further comprising:
determining, by the first node, a frame lifetime value associated with the second node based on the first link latency;
in response to the first node determining that a second backoff duration for a second frame has elapsed and prior to retransmitting the second frame to the second node, determining, by the first node, that a time period corresponding to the frame lifetime value has elapsed; and
in response to the first node determining that the time period corresponding to the frame lifetime value has elapsed, dropping, by the first node, the second frame and forgoing retransmitting the second frame.

9. The method of claim 8, wherein determining the frame lifetime value associated with the second node based on the first link latency comprises multiplying the first link latency by a scaling factor.

10. One or more non-transitory computer-readable media storing program instructions that, when executed by one or more processors at a first node device, cause the one or more processors to perform operations comprising:
determining a first latency period from a start of a first slot through an end of the first slot and to a start of a next slot in a unicast listening schedule of a second node device;
in response to detecting an unsuccessful attempt to transmit a first message to the second node device, determining a length of a first backoff duration based on the first latency period; and
in response to determining that the first backoff duration has elapsed, retransmitting the first message to the second node device.

11. The one or more non-transitory computer-readable media of claim 10, wherein the first latency period is determined based on a sum of an inactive slot time from the first slot to the next slot and an active slot time for the first slot.

12. The one or more non-transitory computer-readable media of claim 10, wherein the length of the first backoff duration is further based on a retry count for the first message.

13. The one or more non-transitory computer-readable media of claim 10, wherein determining the length of the first backoff duration based on the first latency period comprises determining a random value based on the first latency period.

14. The one or more non-transitory computer-readable media of claim 10, wherein the operations further comprise:
determining a second latency period associated with a third node device based on a second unicast listening schedule for the third node device;
in response to detecting an unsuccessful attempt to transmit a second message to the third node device, determining a length of a second backoff duration based on the second latency period; and
in response to determining that the second backoff duration has elapsed, retransmitting the second message to the third node device.

15. The one or more non-transitory computer-readable media of claim 14, wherein the second latency period is different from the first latency period.

16. The one or more non-transitory computer-readable media of claim 11, wherein the operations further comprise:
determining a message lifetime value associated with the second node device based on the first latency period;
in response to determining that a second backoff duration for a second message has elapsed and prior to retransmitting the second message, determining that a time period corresponding to the message lifetime value has elapsed; and
in response to determining that the time period corresponding to the message lifetime value has elapsed, dropping the second message without retransmitting the second message.

17. A network device in a wireless mesh network, comprising:
a transceiver;
one or more processors; and
memory storing instructions that, when executed by the one or more processors, cause the one or more processors to perform operations comprising:
determining a first link latency for a first neighboring network device, wherein the first link latency includes a first length of time of a slot in a unicast channel hopping schedule for the first neighboring network device and a second length of time from the slot to a next slot in the unicast channel hopping schedule;
in response to detecting a failure in sending a frame to the first neighboring network device, calculating a length of a first backoff duration based on first link latency; and
in response to determining that the first backoff duration has elapsed, resending the frame to the first neighboring network device via the transceiver.

18. The network device of claim 17, wherein the operations further comprise:
determining, based on a length of time between consecutive transmission slots of a unicast channel hopping schedule for a second neighboring network device, a second link latency associated with the second neighboring network device;
in response to detecting a failure in sending a second frame to the second neighboring network device, calculating a length of a second backoff duration based on the second link latency; and in response to determining that the second backoff duration has elapsed, resending the second frame to the second neighboring network device via the transceiver.

19. The network device of claim 18, wherein the second link latency is different from the first link latency.

20. The network device of claim 17, wherein the operations further comprise:

calculating a frame lifetime value associated with the first neighboring network device based on the first link latency;

in response to determining that a second backoff duration has elapsed for a second frame and prior to resending the second frame, determining that a time period corresponding to the frame lifetime value has elapsed; and in response to determining that the time period corresponding to the frame lifetime value has elapsed, dropping the second frame.

\* \* \* \* \*